(12) United States Patent
Flothmann et al.

(10) Patent No.: US 9,987,992 B2
(45) Date of Patent: Jun. 5, 2018

(54) BLIND ESPECIALLY FOR STORAGE COMPARTMENT IN A MOTOR VEHICLE

(71) Applicant: fischer automotive systems GmbH & Co. KG, Horb a.N. (DE)

(72) Inventors: Jorg Flothmann, Bondorf (DE); Gunter Leopold, Baiersbronn (DE)

(73) Assignee: FISCHER AUTOMOTIVE SYSTEMS GMBH & CO. KG, Horb A.N. (DE)

( * ) Notice: Subject to any disclaimer, the term of this patent is extended or adjusted under 35 U.S.C. 154(b) by 162 days.

(21) Appl. No.: 15/061,321

(22) Filed: Mar. 4, 2016

(65) Prior Publication Data

US 2016/0257257 A1 Sep. 8, 2016

(30) Foreign Application Priority Data

Mar. 5, 2015 (DE) ........................ 10 2015 002 848

(51) Int. Cl.
*B60R 7/04* (2006.01)

(52) U.S. Cl.
CPC ...................................... *B60R 7/04* (2013.01)

(58) Field of Classification Search
CPC ....................................................... B60R 7/04
USPC ........................... 296/37.8, 24.34; 160/231.2
See application file for complete search history.

(56) References Cited

U.S. PATENT DOCUMENTS

| | | | | |
|---|---|---|---|---|
| 8,579,348 B1* | 11/2013 | Myers | ....................... | B60R 7/04 296/24.34 |
| 2005/0252317 A1* | 11/2005 | Ueki | ........................ | B60R 7/04 74/29 |
| 2007/0045366 A1* | 3/2007 | Kato | ........................ | B60R 7/04 224/312 |
| 2009/0102245 A1* | 4/2009 | Dorin | ........................ | B60J 7/04 296/220.01 |
| 2012/0305202 A1* | 12/2012 | Ganz | .................... | B60N 2/4686 160/133 |
| 2015/0184445 A1* | 7/2015 | Lin | ........................... | E06B 3/46 220/200 |

FOREIGN PATENT DOCUMENTS

| | | |
|---|---|---|
| DE | 102 58 468 B3 | 8/2004 |
| DE | 10 2009 032 733 A1 | 2/2010 |
| EP | 0 569 389 A1 | 11/1993 |
| EP | 0 596 389 A1 | 5/1994 |
| JP | 2008-024099 A | 2/2008 |
| WO | WO 92/12793 A1 | 8/1992 |

OTHER PUBLICATIONS

German Search Report dated Nov. 17, 2015 for German Application No. 10 2015 002 757.3.

* cited by examiner

*Primary Examiner* — Joseph D. Pape

(74) *Attorney, Agent, or Firm* — Renner, Otto, Boisselle & Sklar, LLP

(57) ABSTRACT

A blind for closing a storage compartment in a motor vehicle is provided. The blind has slats arranged on rod-shaped guide elements which are slidably guided in guideways. According to the invention, each slat covers two guide elements and is attached to one of the guide elements and rests on the other guide element. The invention enables slats to be long in a sliding direction of the blind while the guideways have a small radius of curvature.

12 Claims, 1 Drawing Sheet

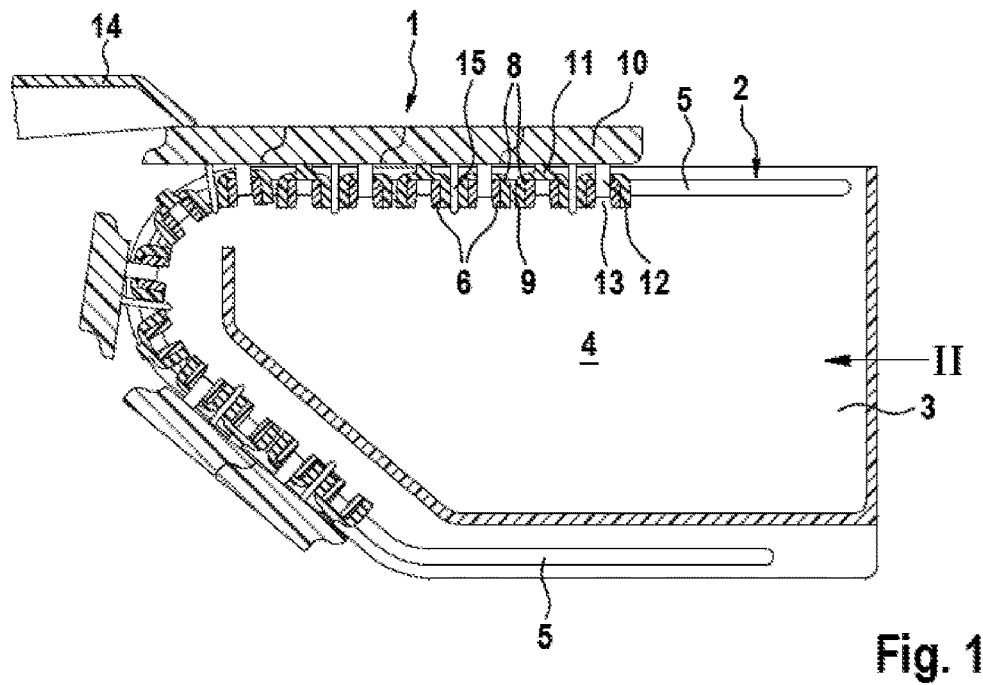
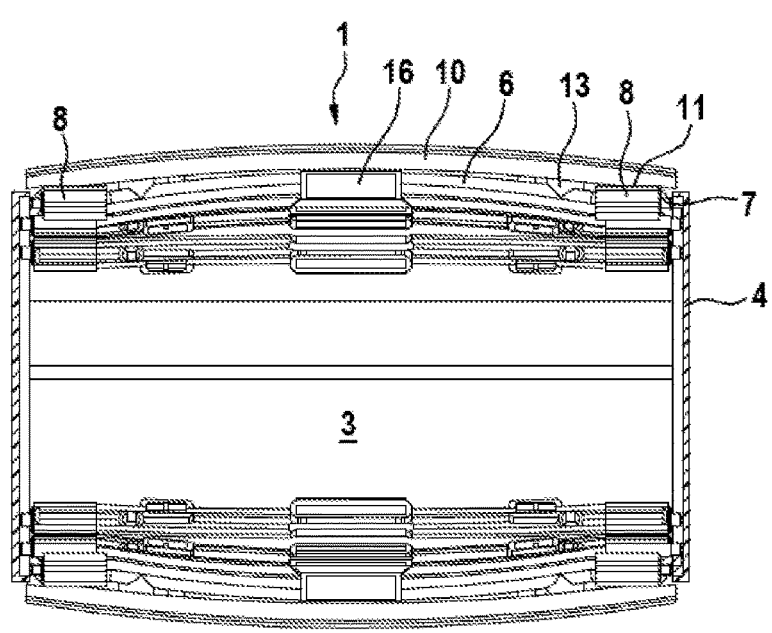

BLIND ESPECIALLY FOR STORAGE COMPARTMENT IN A MOTOR VEHICLE

CROSS-REFERENCE TO RELATED APPLICATION

The present application claims priority under 35 USC § 119 to German Patent Application No. 10 2015 002 848.0, filed on Mar. 5, 2015, the entire disclosure of which are incorporated herein by reference.

TECHNICAL FIELD OF THE INVENTION

The invention relates to a blind for closing an opening. In particular, the blind is intended for closing a storage compartment in a motor vehicle.

DESCRIPTION OF THE RELATED ART

Such a blind for a storage compartment in a motor vehicle is known from Offenlegungs-schrift DE 10 2009 032 733 A1. The storage compartment is arranged in a central console in the motor vehicle and, in its intended use position, is open at the top. On two mutually parallel sides the storage compartment has grooves as guideways for the blind, which guideways initially run in a straight line laterally along the opening of the storage compartment and then run in a convex curve around the front or back of the storage compartment and under the storage compartment. The blind is able to slide in the guideways from a closed position, in which it closes the opening of the storage compartment, through the curved portions of the two guideways into an open position under the storage compartment, the blind, when in the open position, being located in the region of the curved portions and otherwise under the storage compartment. The blind has slats which extend from one guideway to the other transversely with respect to a sliding direction of the blind and which are slidably guided in the guideways. The slats are articulatedly connected so that they are able to pivot relative to one another in the curved portions of the guideways. The slats overlap one another on transverse sides, the term "transverse sides" denoting the sides which extend transversely with respect to the sliding direction of the blind. They are the long sides of the slats. In the region of the curved portions of the guideways, overlapping portions of the slats lift away, windmill-sail-like, from overlapped regions of the respective next slats.

Patent DE 102 58 468 B3 discloses a blind for a cupboard. In order that the guideways have a small radius of curvature, only every second slat of the known blind has a guide element at each end, which guide element is slidably guided on lateral guideways. In addition, the guide elements are arranged offset with respect to the slats, so that the slats are located on the outside in convexly curved portions of the guideways. Because only every second slat has a guide element there is a gap between the guide elements which becomes smaller in the region of convexly curved portions of the guideways. The gap between the guide elements makes it possible to achieve the narrow radius of curvature of the guideways mentioned at the beginning of this paragraph.

SUMMARY OF THE INVENTION

The problem of the invention is likewise to propose a blind which makes it possible for its guideway to have a small radius of curvature. "Small" is here to be understood as meaning small in relation to a length of the slats of the blind, the length of the slats being their extent in the sliding direction of the blind and accordingly normally being a considerably smaller dimension or substantially shorter side of the slat. The blind is especially intended for closing a storage compartment in a motor vehicle.

That problem is solved by the invention described herein. For example, a blind serves for closing an opening, which opening has a guideway for slidable guidance of the blind. The guideway slidably guides guide elements of the blind which are arranged one after the other in a sliding direction of the blind and are articulatedly connected to one another. "Articulatedly" means here that the guide elements are able to pivot relative to one another, so that they are able to slide through curved sections of the guideway. Furthermore, the blind has slats which in the sliding direction of the blind are likewise arranged one after the other and on the guide elements. "On" means that the slats are spaced apart from the guide elements or from the guideway perpendicularly to a plane of the blind. The spacing of the slats from the guide elements relates to the slat itself and here especially to the one visible side of the slat, but not to any connecting elements integral with the slat and used for connection to the guide elements. In the region of a convexly curved portion of the guideway the slats are located on an outer side of the curved portion. The slats are articulatedly connected by way of the guide elements. Preferably the slats arranged one after the other in the sliding direction of the blind follow closely one after the other or overlap one another. "Closely" means that in straight regions of the guideway the slats abut one another or at most have a small gap between them. In the region of a convexly curved portion of the guideway the slats move apart from one another, that is to say a gap is formed between the slats, i.e. the spacing between them becomes larger. According to the invention, the slats cover at least two guide elements and are attached to one of the covered guide elements. "Cover" here means especially with respect to a direction perpendicular to a visible face of the slat. In particular, covering may be only partial. This enables slats to be longer in the sliding direction of the blind than a spacing of the guide elements from one another. In particular, in the sliding direction of the blind a slat is twice as long as the spacing between two guide elements plus any overlapping of the slats. The invention enables slats to be long in the sliding direction of the blind in relation to a smallest possible radius of curvature of the guideway, which is determined by the spacing between the articulatedly interconnected guide elements slidably guided with the guideway. A small spacing between the guide elements enables the guideway to have a small radius of curvature. In the region of convexly curved sections of the guideway the slats project tangentially. To be precise, the slats project parallel to tangents of the convexly curved guideway, because the slats are arranged on the guide elements and accordingly are located on an outer side or outside of convexly curved sections of the guideway. In straight sections of the guideway the slats of the blind according to the invention are located in a plane parallel to the guideway and can thereby be constructed and arranged so that they form a closed surface or, if desired, a surface having gaps between the slats.

In accordance with one arrangement of the invention, in the sliding direction of the blind the slats are longer than a spacing of two adjacent guide elements from one another, the slats especially being at least twice as long as the spacing of two adjacent guide elements from one another.

In the sliding direction of the blind, the slats can in principle be attached to the guide elements at any point between a front and a rear transverse side, that is to say, for example, in a central region. The transverse sides of the slats run transversely with respect to the sliding direction of the blind and are normally long sides of the slats. "Front" and "rear" relate to an opening direction of the blind. Preferably the slats are attached to the guide elements close to one of their transverse sides and preferably close to a rear transverse side. "Close" means, if the slat is notionally divided into three, arranged inside the nearest third. As a result, when the blind is opened, the slats are only late in pivoting out of the plane of the blind when the slats pass into the region of a convexly curved portion of the guideway. If, when the blind is opened, the slats pass under a cover in the region of the convexly curved portion of the guideway, in this arrangement of the invention the slats move for longer in a straight line under the cover before they pivot in the direction of the curved portion of the guideway.

In a preferred arrangement of the invention, outside of a region of a convexly curved portion of the guideway the slats rest on a guide element which they cover without being attached thereto. The guide elements which are covered by the slats but to which the slats are not attached form bearing surfaces for the slats which support the slats. In order to avoid rattling noises, the slats can rest under bias on the guide elements and/or there can be rubber-elastic bearing surfaces on the guide elements and/or on the slats.

A preferred arrangement of the invention provides that the slats have holding-down members which engage between two guide elements arranged one after the other and are released in a convexly curved portion of the guideway. The holding-down members can, for example, be held clamped between the guide elements and/or can engage behind them. Outside of convexly curved regions of the guideway, the holding-down members prevent the slats from lifting away from the guide elements to which the slats are not attached and from pivoting upwards. If, during a sliding movement of the blind, the guide elements pass into a convexly curved region of the guideway, they pivot apart from one another and release the holding-down members. If, conversely, the guide elements pass from a convexly curved portion of the guideway into a straight section, the guide elements pivot together and clamp the holding-down members in place and/or enter into engagement with the holding-down members.

In order that an opening can be closed with the blind without a gap, in one arrangement of the invention the slats overlap one another.

In particular, the blind according to the invention is configured in such a way that it can be guided by two guideways which run in two mutually parallel planes that are spaced apart from one another. Seen from one side, the guideways are congruent. In a preferred arrangement of the invention, the guide elements are articulatedly connected to one another close to the guideways. Such an arrangement of the invention enables guide elements to extend from one guideway to the other transversely with respect to the sliding direction of the blind and to have in principle any desired shape between the guideways. Such guide elements can, for example, be arcuately curved.

BRIEF DESCRIPTION OF THE DRAWING

The invention is described in greater detail below with reference to an exemplary embodiment shown in the drawing. The Figures are simplified diagrams for under-standing and explaining the invention. In the drawing:

FIG. 1 is a longitudinal section through the blind according to the invention; and FIG. 2 is a view of the blind in accordance with arrow II in FIG. 1.

DETAILED DESCRIPTION OF THE INVENTION

The blind 1 according to the invention shown in the drawing serves for closing an opening 2 of a storage compartment 3 in a motor vehicle. In the exemplary embodiment the storage compartment 3 is arranged in a central console of the motor vehicle and, in an intended use position, is open at the top. The storage compartment 3 has two mutually parallel side walls 4 having grooves as guideways 5 in mutually opposing inner sides. The guideways 5 are accordingly arranged in two mutually parallel planes that are spaced apart from one another. Seen from one side, the two guideways 5 are congruent. They form a sliding guide means for the blind 1. The guideways 5 run in a straight line laterally along the opening 2 and at the end of the opening 2 pass into a convexly curved portion where they run around one end of the storage compartment 3 under the underside thereof.

The blind 1 has guide elements 6 which extend from one guideway 5 to the other transversely with respect to a sliding direction of the blind 1. The guide elements 6 are rod-shaped with a U-shaped profile and guide pins 7 at their ends which engage slidably in the guideways 5. The guide elements 6 are convexly curved, as can be seen in FIG. 2. Other arrangements of the guide elements are possible; also possible are guide elements which do not extend transversely from one guideway 5 to the other but are formed only on the guideways 5 (not shown).

In end sections close to the guideways 5, the guide elements 6 are overmoulded with an elastomer 8 which forms tongues 9 between the guide elements 6, which tongues connect the guide elements 6. The tongues 9 are flexible, so that the guide elements 6 are able to pivot relative to one another, which can also be termed articulated connection of the guide elements 6. By virtue of their connections with the flexible tongues 9, the guide elements 6 are able to slide along the guideways 5 together without difficulty and without jamming, even through the curved regions. The guide elements 6 can also be pivotally or articulatedly connected to one another in some other way (not shown).

On the guide elements 6 there are arranged slats 10 which extend over the entire opening 5 transversely with respect to the sliding direction of the blind 1 and cover the side walls 4. The slats 10 form a visible surface at the top and each cover two guide elements 6. In the sliding direction of the blind 1, the slats 10 are twice as long as a spacing of two guide elements 6 from one another, that spacing being the spacing from centre to centre of the guide elements 6. In the region of straight sections of the guideways 5, the slats 10 abut one another with their transverse sides. The transverse sides of the slats 10 extend transversely with respect to the sliding direction of the blind 1 and are multiple times longer than the slats 10 in the sliding direction of the blind 1. In order to avoid gaps, the slats 10 overlap one another on their transverse sides.

Each slat 10 is attached to a guide element 6 and in the region of straight sections of the guideways 5 rests on a different guide element 6. To avoid rattling noises, the guide elements 6 have elastomeric bearing surfaces 11 for the slats 10. In the exemplary embodiment, the attachment of the slats 10 to the guide elements 6 is effected with pins 12 as connecting elements on undersides of the slats 10, which pins are clamped in receiving holes 13 of the guide elements 6. Other types of connection, for example locking connections or adhesive bonding, are possible (not shown). "On" means that the slats 10 are arranged on the sides of the guide elements 6 remote from the storage compartment 3; below the storage compartment 3 the slats 10 are located below the guide elements 6. "Underside" refers to a side of the slats 10 facing the guide elements 6. The attachment of the slats 10 each to one guide element 6 is effected close to a rear transverse side of the slats 10 in the opening direction of the blind 1. "Convex" refers to the slats 10 which, also in the region of a convexly curved portion of the guideways 5, are located on an outer side of the convexly curved portion of the guideways 5. If the guide elements 6 pass into a convexly curved portion of the guideways 5, the slats 10 lift away from the guide elements 6 to which they are not attached but on which they only rest in the region of straight sections of the guideways 5. This enables the radius of curvature of the guideways 5 to be small in relation to a length of the slats 10 in the sliding direction of the blind 1. The invention enables the slats 10 to be long in the sliding direction of the blind 1 in relation to a radius of curvature of the guideways 5. In the region of convexly curved sections of the guideways 5, the slats 10 project parallel to tangents of the guideways 5 at the locations where the guide element 6 to which the slat 10 in question is attached is located. A smallest possible radius of curvature of the guideways 5 is determined by the spacing of the centres of the guide elements 6 or an axial spacing of the guide pins 7 which are slidably guided in the guideways 5.

Because the slats 10 are each attached to the rear guide element 6 in the opening direction of the blind 1, the slats 10 for a long time remain in one plane when the blind 1 is opened. Only when the rear guide element 5 passes into the curved section of the guideways 5 does the slat 10 in question pivot downwards out of the plane. This makes possible a cover 14 of the blind 1 at one end of the storage compartment 3, which cover does not overlap the storage compartment 3 or overlaps the latter only to a small extent. Nevertheless, when the blind 1 is opened, the slats 10 slide under the cover 14 without any enlargement of a gap between the cover 14 and the slats 10.

The slats 10 have holding-down members 15. In the exemplary embodiment these holding-down members are in the form of ribs which project from the undersides of the slats 10 and engage between the guide elements 6. In the region of straight sections of the guideways 5, the holding-down members 15 are held clamped between the guide elements 6, for which purpose, in the exemplary embodiment, the guide elements 6 have friction-increasing elastomeric elements in the region of the holding-down members 15. Also possible are arrangements in which the holding-down members 15 engage behind an undercut of those guide elements 6 on which the slats 10 only rest and to which they are not attached (not shown). If, during a sliding movement of the blind 1, the guide elements 6 pass into curved sections of the guideways 5, the guide elements 6 pivot away from one another so that the holding-down members 15 are released. Conversely, if, during a sliding movement of the blind 1, the guide elements 6 pass out of curved sections of the guideways 5 into straight sections, they pivot together and clamp the holding-down members 15 in place between them, so that in straight sections of the guideways 5 the slats 10 are prevented from lifting. In a case where the holding-down members 15 engage behind the guide elements 6, such engagement takes place when the guide elements 6 pass from curved sections of the guideways 5 into straight sections (not shown).

LIST OF REFERENCE NUMERALS

Blind Especially for a Storage Compartment in a Motor Vehicle 1 blind
2 opening
3 storage compartment
4 side wall
5 guideway
6 guide element
7 guide pin
8 elastomer
9 tongue
10 slat
11 bearing surface
12 pin
13 receiving hole
14 cover
15 holding-down member
16 clamping element

The invention claimed is:

1. A blind for closing an opening, the blind comprising:
   a first guideway and a second guideway for slidable guidance of the blind;
   a first guide elements and a second guide element arranged in a sliding direction of the blind, wherein the first guide element and the second guide element are articulatedly connected to one another and serve for slidable guidance along the first guideway and the second guideway; and
   slats arranged in the sliding direction of the blind, the slats being arranged on the first element and the second element, wherein each of the slats covers at least the first guide element and the second guide element, each of the slats being attached to the first guide element and being detached from the second guide element.

2. The blind according to claim 1, wherein in the sliding direction of the blind the slats are longer than a spacing between the first guide element and the second guide element from centre to centre of the first guide elements and the second guide element.

3. The blind according to claim 1, wherein each of the slats is attached to the first guide element close to a transverse side of the slat.

4. The blind according to claim 3, wherein each of the slats is attached to the first guide element close to a rear transverse side of the slat in an opening direction of the blind.

5. The blind according to claim 1, wherein at least one of the first guideway and the second guideway has a convexly curved portion, and wherein outside of the convexly curved portion, each of the slats rests on the second guide element.

6. The blind according to claim 1, wherein each of the slats has a holding-down member which engages between the first guide element and the second guide element, the holding-down member being released in a convexly curved portion of the first guideway or the second guideway.

7. The blind according to claim 1, wherein the slats overlap one another.

8. The blind according to claim 1, wherein the first and the second guideway are arranged in mutually parallel planes that are spaced apart from one another, and the first guide element and the second guide element are articulatedly connected to one another close to the first guideway and the second guideway.

9. A blind according to claim 2, wherein each of the slats is attached to the first guide element close to a transverse side of the slat.

10. The blind according to claim 2, wherein at least one of the first guideway and the second guideway includes a convexly curved portion, and wherein outside of the convexly curved portion, the slat rests on the second guide element.

11. The blind according to claim 3, wherein at least one of the first guideway and the second guideway includes a convexly curved portion, and wherein outside of the convexly curved portion, the slat rests on the second guide element.

12. The blind according to claim 4, wherein at least one of the first guideway and the second guideway includes a convexly curved portion, and wherein outside of the convexly curved portion, the slat rests on the second guide element.

* * * * *